2,865,845

HYDROFORMING CATALYST PROMOTED BY THE ADDITION OF A ZINC HALIDE

Kenneth K. Kearby, Cranford, N. J., assignor to Esso Research and Engineering Company, a corporation of Delaware No Drawing. Application June 15, 1953
Serial No. 361,821

6 Claims. (Cl. 208—136)

This invention relates to the use of solid catalysts in the treatment and conversion of hydrocarbon materials. More particularly, it relates to the preparation and use of catalysts comprising an active metal oxide supported of an alumina-containing carrier, and methods of enhancing the activity of such catalysts.

Recent developments in the petroleum refining industry have concentrated attention upon methods for the conversion of low-boiling feed stocks, particularly those in the middle and heavy portions of the naphtha boiling range, into products of increased aromatic content and improved motor fuel value. Considerable success along these lines has been obtained by the process known as hydroforming. In this process the hydrocarbon feed stock is vaporized and treated at operating temperatures of about 700–1000° F. in the presence of a catalyst of suitable activity and in a hydrogen-containing atmosphere at a controlled hydrogen partial pressure such that the hydrocarbon transformation reactions taking place result in a net production of hydrogen. A variety of isomerization and hydrogen transfer reactions are involved, which may include dehydrogenation, dealkylation, paraffin and naphthene isomerization, cyclization or aromatization. Many of these reactions result in the formation of aromatic hydrocarbons, either directly or by a sequence of intermediate steps. All of them together result in producing a product of markedly improved motor fuel value, as determined by octane rating, volatility and engine cleanliness characteristics.

Catalysts which have been found useful in the hydroforming process include various metals and metal oxides, chiefly those in groups V, VI, and VIII of the periodic table. The catalyst supports which have given best results are those containing alumina as a major constituent. The alumina is preferably of the active or activated type, having a large surface area, prepared by the controlled partial dehydration of a suitable alumina hydrate. Thus useful catalysts have been prepared using various commercial grades of activated alumina, or aluminas prepared in various ways from alumina gel, alumina sols, precipitated alumina or the like. Particularly useful catalysts have been found consisting of molybdic oxide or chromic oxide supported on a suitable alumina base.

In some cases it has been found beneficial to prepare an alumina support which is substantially free of cationic impurities, and in other cases the addition of controlled amounts of silica, CaO, MgO, ZnO or $ZrO_2$ has been helpful. The addition of a large amount of zinc oxide, for example, may convert the alumina more or less completely to a zinc aluminate spinel, where stability to heat is important.

Whenever such stabilizers or promoters have been added to the support to modify the catalyst, it is important to retain both high surface activity and selectivity in the catalyst. These requirements have generally led to the use of these additives in the form of the oxide, to minimize any tendency toward sintering or migration on the catalyst surface. Contrary to this procedure, it has now been found that improved activity may be obtained in the preparation of molybdena-alumina catalysts by incorporating significant amounts of a zinc halide as a promoter.

According to the present invention, the promotional effects of silica and zinc on an alumina-molybdena type hydroforming catalyst can be combined, by incorporating the zinc in the composition in the form of zinc chloride or zinc fluoride. The zinc halides are particularly useful components in hydrocarbon conversion catalysts because of their ability to promote isomerization reactions, such as the conversion of methyl cyclopentanes to cyclohexanes which can then be easily transformed into aromatics. It has now been found that the zinc halides can be used in this way as a component of hydroforming catalysts on an active alumina support, in spite of the fact that the halides themselves are much more low-melting and volatile than zinc oxide. The effect is not limited to molybdena catalysts but is also found with other alumina-base catalysts such as alumina-chromia or alumina-vanadia catalysts. The amount of zinc halide to be added may be 1 to 20% by weight of the total metal composition, with 3% to 10% preferred. The zinc halide may be used alone or in combination with promotional amounts of zinc oxide or aluminum chloride. These additives have been especially beneficial to alumina-molybdena catalysts containing 5 wt. percent to 20 wt. percent of $MoO_3$.

Alumina-molybdena catalysts to be prepared using the principle of the present invention may be prepared using any of the conventional methods: by wet impregnation with a suitable molybdenum compound, such as ammonium molybdate, molybdic acid or molybdenum blue; by dry mixing with molybdic acid or ammonium molybdate; or by coprecipitation from solution or from mixed hydrosols. The invention is not limited to any particular type or source of the alumina. The alumina support may also be modified in various ways to control its surface area, pore size, or other physical characteristics. For use in a fluid solids type operation, for example, it is particularly desirable to have a high particle density for a given catalyst activity, which permits a higher throughput or plant capacity for a given size treating vessel. Such high density particles can be produced in a precipitated alumina by adding a polyhydroxy organic dispersing agent such as gluconic acid to the reactant mixture before precipitation.

In a preferred embodiment, the zinc halide is introduced to a suitable predried alumina support by wet impregnation, and then dried and calcined before incorporating the molybdena to make up the finished catalyst. It will be understood, however, that the zinc halide solution may be introduced in other ways.

The addition of the zinc halide to the alumina-molybdena catalyst shows a definite yield advantage at a given octane number. The results obtained in the use of these catalysts indicate that the activity is enhanced while at the same time there is a significant decrease in the amount of cracking to $C_4$ minus material. Taken together, these factors result in a very desirable increase in the yield of gasoline at premium quality level.

Having thus described the general principles involved, a specific example will now be given of the preparation and use of a catalyst according to the present invention.

EXAMPLE I

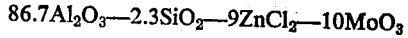
$86.7Al_2O_3$—$2.3SiO_2$—$9ZnCl_2$—$10MoO_3$

The alumina base for this catalyst was made up from two stock solutions:

(A) Aluminum sulfate, made up by dissolving 29.75 lbs. of technical iron-free aluminum sulfate in enough distilled water in a wooden vat to make 103.5 gallons of solution, acidified with 380 ml. of 96.6% sulfuric acid, and (B) A solution of 29.25 lbs. of sodium aluminate (Nalco #680, National Aluminate Company) in enough distilled water to make 102.5 gallons, in a 300 gal. wooden vat, to which was added 707 grams of 40–42° Bé. sodium silicate, 300 grams of 50% gluconic acid and 300 grams of sodium hydroxide.

To form the precipitate, most of solution (A) was stirred vigorously into solution (B) in about 1.5 minutes, after which the pH was adjusted to 9.1 by adding the remaining solution (A). The resultant slurry was filtered in twenty-four 18 x 18 x 1 inch frames of a filter press and blown with air.

Three-quarters of the cake was slurried again in enough water to give a total valume of 30 gallons, and treated by the addition of 330 ml. of concentrated ammonium hydroxide. The treater slurry was again filtered, back washed on the filter press with 90 gallons of distilled water, and after air blowing the base had an ignition loss of 90.9 wt. percent.

The washed alumina base thus prepared was first peptized by adding 74 grams of glacial acetic acid to 44.5 lbs. of the alumina. This composite was dried at 250° F., calcined 3 hours at 1200° F., and wet impregnated with an aqueous solution containing 198 grams of 95% zinc chloride in just sufficient water to completely wet the precipitate. The impregnated base was dried at 400° F., calcined at 1200° F. for 3 hours, and then wet impregnated with an ammoniacal solution containing 190 grams of ammonium molybdate.

The finished catalyst composite was dried at 400° F., calcined 6 hours at 1200° F., and pilled, giving a product analyzing 0.78% sulfate and 5.71% zinc. The yield was 1284 grams (1350 milliliters) of pills, referred to hereinafter as catalyst A.

The hydroforming activity of this catalyst (A) was compared with an exactly similar catalyst (B), containing no zinc halide. This comparison was made in a series of runs using a standard test procedure involving the treatment of a 200° to 330° F. mixed virgin naptha, having about 45% paraffin, 43% naphthene and 12% aromatic hydrocarbons, feeding hydrogen at the rate of 2,000 cu. ft. per barrel of oil, at 200 lbs. operating pressure and 900° F., for a 4-hour treating cycle. The results of these tests were as follows:

*Effect of zinc chloride on hydroforming catalysts*

$90(97.5\ Al_2O_3 - 2.5\ SiO_2) - 10\ MoO_3$

[200–330° F. Virgin naphtha, 900° F., 200 p. s. i. g., 2000 cu. ft. $H_2$/bbl.]

| Catalyst | B | A |
|---|---|---|
| $ZnCl_2$, wt. percent | 0 | 9 |
| Yields at 95 Research O. N. (clear): | | |
| $C_5+$ gasoline, Vol. percent | 79 | 80 |
| $C_1$–$C_3$ gas, wt. percent | 11.5 | 11 |
| $C_4$, Vol. percent | 6 | 6 |
| Carbon, wt. percent | 0.7 | 0.6 |
| Activity, w./hr./w | 0.55 | 0.45 |

These results, correlated from the series of test runs and corrected to give yields at a common premium quality level of 95 research octane, show a 1% improvement in yield with catalyst A. A statistical analysis of the data used in this correlation indicates that there is better than 95% confidence level, that the difference shown is real. This improvement is attributed solely to the addition of zinc halide, since the catalysts are otherwise identical.

In the same series of test runs, a number of minor modifications of the catalysts tested here all give correlated yields of 77 to 79 at the 95 Research octane level, indicating that the catalysts of the present invention represent a significant advance in the art. In this series, for example, an alumina base prepared exactly as for catalysts A and B but without either the zinc chloride or the acetic acid peptizing agent gave a correlated yield of 79, with no significant changes in activity or product distribution.

EXAMPLE II

The stability of catalyst A in use is indicated by the results of 8 successive cycles of 4 hours on stream in the standard test procedure, with oxidative regeneration following each on stream period. The activity and selectivity showed no significant change with time during this period. Thus, the feed rate found for 95 O.N. was 0.46 w./hr./w. at 80.0% yield in the 8th cycle, with only random variations within the experimental error of these values during the entire test.

An exactly similar catalyst containing $ZnCl_2$ and no silica was found to show somewhat lower selectivity (77.5% yield at 95 O.N.) but high activity and activity maintenance during 17 cycles on stream.

It will be appreciated that even a slight increase in yield at a given octane level is of tremendous economic importance in the refining of petroleum hydrocarbons. It will be understood, furthermore, that the practice of this invention is not to be limited to the exact numerical limits shown by way of illustration in the above example, and that the same advantages may be realized in varying degrees by employing equivalent zinc halides in varying amounts, as described, and as claimed specifically as follows.

What is claimed is:

1. A molybdena-alumina catalyst for the hydroforming of hydrocarbons consisting essentially of from about 8%–20% of molybdenum oxide supported on an active alumina base and promoted by the addition thereto of from about 3 to 10 wt. percent of a zinc halide.

2. A catalyst according to claim 1 in which the active alumina base is prepared from a peptized alumina gel, heat stabilized by the addition thereto of from about 0.5% to 5% by weight of silica.

3. A catalyst according to claim 1 in which said zinc halide is $ZnCl_2$.

4. A process for obtaining improved yields of a premium quality naphtha by hydroforming a heavy virgin naphtha feed stock over an active alumina-molybdenum oxide catalyst which has incorporated therein from about 3% to 10% by weight of a zinc halide.

5. The process according to claim 4 in which said zinc halide promoted hydroforming catalyst is supported on an alumina base prepared from a peptized alumina gel which is heat stabilized by the addition thereto of from about 0.5% to 5% by weight of silica.

6. The process according to claim 4 in which said zinc halide is $ZnCl_2$.

References Cited in the file of this patent

UNITED STATES PATENTS

| | | |
|---|---|---|
| 2,382,260 | Schaad | Aug. 14, 1945 |
| 2,388,937 | Schmerling et al. | Nov. 13, 1945 |
| 2,448,211 | Caeser et al. | Aug. 31, 1948 |
| 2,437,531 | Huffman | Mar. 9, 1949 |
| 2,508,014 | Davidson | May 16, 1950 |
| 2,574,480 | Hillyer | Nov. 13, 1951 |
| 2,636,865 | Kimberlin | Apr. 28, 1953 |
| 2,677,649 | Kirshenbaum et al. | May 4, 1954 |